(12) United States Patent
He et al.

(10) Patent No.: US 11,934,952 B2
(45) Date of Patent: Mar. 19, 2024

(54) SYSTEMS AND METHODS FOR NATURAL LANGUAGE PROCESSING USING JOINT ENERGY-BASED MODELS

(71) Applicant: Salesforce, Inc., San Francisco, CA (US)

(72) Inventors: Tianxing He, Cambridge, MA (US); Ehsan Hosseini-Asl, Palo Alto, CA (US); Bryan McCann, Menlo Park, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 647 days.

(21) Appl. No.: 17/124,317

(22) Filed: Dec. 16, 2020

(65) Prior Publication Data
US 2022/0058348 A1     Feb. 24, 2022

Related U.S. Application Data

(60) Provisional application No. 63/068,526, filed on Aug. 21, 2020.

(51) Int. Cl.
*G06N 3/08* (2023.01)

(52) U.S. Cl.
CPC ...................... *G06N 3/08* (2013.01)

(58) Field of Classification Search
CPC ....................................................... G06N 3/08
See application file for complete search history.

(56) References Cited

U.S. PATENT DOCUMENTS

| | | | |
|---|---|---|---|
| 10,282,663 B2 | 5/2019 | Socher et al. |
| 10,346,721 B2 | 7/2019 | Albright et al. |
| 10,474,709 B2 | 11/2019 | Paulus |
| 10,521,465 B2 | 12/2019 | Paulus |
| 10,542,270 B2 | 1/2020 | Zhou et al. |
| 10,546,217 B2 | 1/2020 | Albright et al. |
| 10,558,750 B2 | 2/2020 | Lu et al. |
| 10,565,305 B2 | 2/2020 | Lu et al. |
| 10,565,306 B2 | 2/2020 | Lu et al. |
| 10,565,318 B2 | 2/2020 | Bradbury |
| 10,565,493 B2 | 2/2020 | Merity et al. |
| 10,573,295 B2 | 2/2020 | Zhou et al. |
| 10,592,767 B2 | 3/2020 | Trott et al. |
| 10,699,060 B2 | 6/2020 | McCann |
| 10,747,761 B2 | 8/2020 | Zhong et al. |
| 10,776,581 B2 | 9/2020 | McCann et al. |
| 10,783,875 B2 | 9/2020 | Hosseini-Asl et al. |
| 10,817,650 B2 | 10/2020 | McCann et al. |

(Continued)

OTHER PUBLICATIONS

Gao, et al. "Flow Contrastive Estimation of Energy-Based Models," CVPR Jun. 2020. (Year: 2020).*

(Continued)

*Primary Examiner* — Feng-Tzer Tzeng
(74) *Attorney, Agent, or Firm* — Haynes and Boone LLP

(57) ABSTRACT

Embodiments described herein provide natural language processing (NLP) systems and methods that utilize energy-based models (EBMs) to compute an exponentially-weighted energy-like term in the loss function to train an NLP classifier. Specifically, noise contrastive estimation (NCE) procedures are applied together with the EBM-based loss objectives for training the NLPs.

15 Claims, 7 Drawing Sheets

(56) References Cited

U.S. PATENT DOCUMENTS

| | | |
|---|---|---|
| 10,839,284 B2 | 11/2020 | Hashimoto et al. |
| 10,846,478 B2 | 11/2020 | Lu et al. |
| 2016/0350653 A1 | 12/2016 | Socher et al. |
| 2017/0024645 A1 | 1/2017 | Socher et al. |
| 2017/0032280 A1 | 2/2017 | Socher |
| 2017/0140240 A1 | 5/2017 | Socher et al. |
| 2018/0096219 A1 | 4/2018 | Socher |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0268287 A1 | 9/2018 | Johansen et al. |
| 2018/0268298 A1 | 9/2018 | Johansen et al. |
| 2018/0336453 A1 | 11/2018 | Merity et al. |
| 2018/0373987 A1 | 12/2018 | Zhang et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Xiong et al. |
| 2019/0130896 A1 | 5/2019 | Zhou et al. |
| 2019/0188568 A1 | 6/2019 | Keskar et al. |
| 2019/0213482 A1 | 7/2019 | Socher et al. |
| 2019/0251431 A1 | 8/2019 | Keskar et al. |
| 2019/0258714 A1 | 8/2019 | Zhong et al. |
| 2019/0258939 A1 | 8/2019 | Min et al. |
| 2019/0286073 A1 | 9/2019 | Asl et al. |
| 2019/0355270 A1 | 11/2019 | McCann et al. |
| 2019/0362020 A1 | 11/2019 | Paulus et al. |
| 2019/0362246 A1 | 11/2019 | Lin et al. |
| 2020/0005765 A1 | 1/2020 | Zhou et al. |
| 2020/0019840 A1* | 1/2020 | Guo ............... G06N 3/08 |
| 2020/0065651 A1 | 2/2020 | Merity et al. |
| 2020/0084465 A1 | 3/2020 | Zhou et al. |
| 2020/0089757 A1 | 3/2020 | Machado et al. |
| 2020/0090033 A1 | 3/2020 | Ramachandran et al. |
| 2020/0090034 A1 | 3/2020 | Ramachandran et al. |
| 2020/0103911 A1 | 4/2020 | Ma et al. |
| 2020/0104643 A1 | 4/2020 | Hu et al. |
| 2020/0104699 A1 | 4/2020 | Zhou et al. |
| 2020/0105272 A1 | 4/2020 | Wu et al. |
| 2020/0117854 A1 | 4/2020 | Lu et al. |
| 2020/0117861 A1 | 4/2020 | Bradbury |
| 2020/0142917 A1 | 5/2020 | Paulus |
| 2020/0175305 A1 | 6/2020 | Trott et al. |
| 2020/0184020 A1 | 6/2020 | Hashimoto et al. |
| 2020/0234113 A1 | 7/2020 | Liu |
| 2020/0272940 A1 | 8/2020 | Sun et al. |
| 2020/0285704 A1 | 9/2020 | Rajani et al. |
| 2020/0285705 A1 | 9/2020 | Zheng et al. |
| 2020/0285706 A1 | 9/2020 | Singh et al. |
| 2020/0285993 A1 | 9/2020 | Liu et al. |
| 2020/0302178 A1 | 9/2020 | Gao et al. |
| 2020/0302236 A1 | 9/2020 | Gao et al. |
| 2020/0334334 A1 | 10/2020 | Keskar et al. |
| 2020/0364299 A1 | 11/2020 | Niu et al. |
| 2020/0372116 A1 | 11/2020 | Gao et al. |
| 2020/0372319 A1 | 11/2020 | Sun et al. |
| 2020/0372341 A1 | 11/2020 | Asai et al. |

OTHER PUBLICATIONS

Zhao, et al., "Energy-Based Generative Adversarial Networks," ICLR 2017. (Year: 2017).*

Grathwohl et al., "Your Classifier is Secretly an Energy based Model and You Should Treat it Secretly Like One," ICLR, pp. 1-23, 2019.

Gutmann et al., "Noise-Contrastive Estimation: A New Estimation Principle for Unnormalized Statistical Models," In Proceedings of the Thirteenth International Conference on Artificial Intelligence and Statistics, vol. 9 of Proceedings of Machine Learning Research, pp. 297-304, Chia Laguna Resort, Sardinia, Italy, PMLR.

* cited by examiner

SYSTEMS AND METHODS FOR NATURAL LANGUAGE PROCESSING USING JOINT ENERGY-BASED MODELS

CROSS-REFERENCE

The present application claims priority to U.S. Provisional Patent Application No. 63/068,526, entitled "SYSTEMS AND METHODS FOR NATURAL LANGUAGE PROCESSING," filed on Aug. 21, 2020, which is herein incorporated by reference in its entirety for all purposes.

TECHNICAL FIELD

The present disclosure relates generally to machine learning models and neural networks, and more specifically, to natural language processing (NLP) using energy-based models (EBMs).

BACKGROUND

While deep learning approaches have achieved increasingly better accuracy, such approaches may suffer from several concerning issues such as poor calibration or poor adversarial robustness.

Therefore, there is a need for an efficient deep learning system that achieves satisfactory accuracy, calibration, and robustness.

In the figures, elements having the same designations have the same or similar functions.

DETAILED DESCRIPTION

Existing deep learning systems and methods, such as natural language processing (NLP) systems and methods, may seek to optimize the output accuracy, such as the prediction or classification accuracy, etc. Such systems and methods may report superior prediction confidences. However, the reported prediction confidences may be at odds with other performance factors of the learning systems, such as calibration or adversarial robustness. The tradeoff between different performance metrics may often impair the performance of downstream tasks such as an auto-dialogue agent, etc.

In view of the need for a NLP system to achieve balanced performance in accuracy, calibration, and robustness, embodiments described herein provide NLP systems and methods that utilize energy-based models (EBMs) to compute an exponentially-weighted energy-like term in the loss function to train an NLP classifier. Specifically, noise contrastive estimation (NCE) procedures are applied together with the EBM-based loss objectives for training the NLPs. For example, data samples from a training dataset and noise samples (sampled according to a distribution) are both input to the NLP classifier to generate separate predictions, the energy term computed upon each of which is used to compute the contrastive loss. Various forms of energy functions may be used to compute the energy term, such as but not limited to a direct scalar transformation, a hidden transformation, a sharp-hidden transformation, and/or the like.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Figure 1:
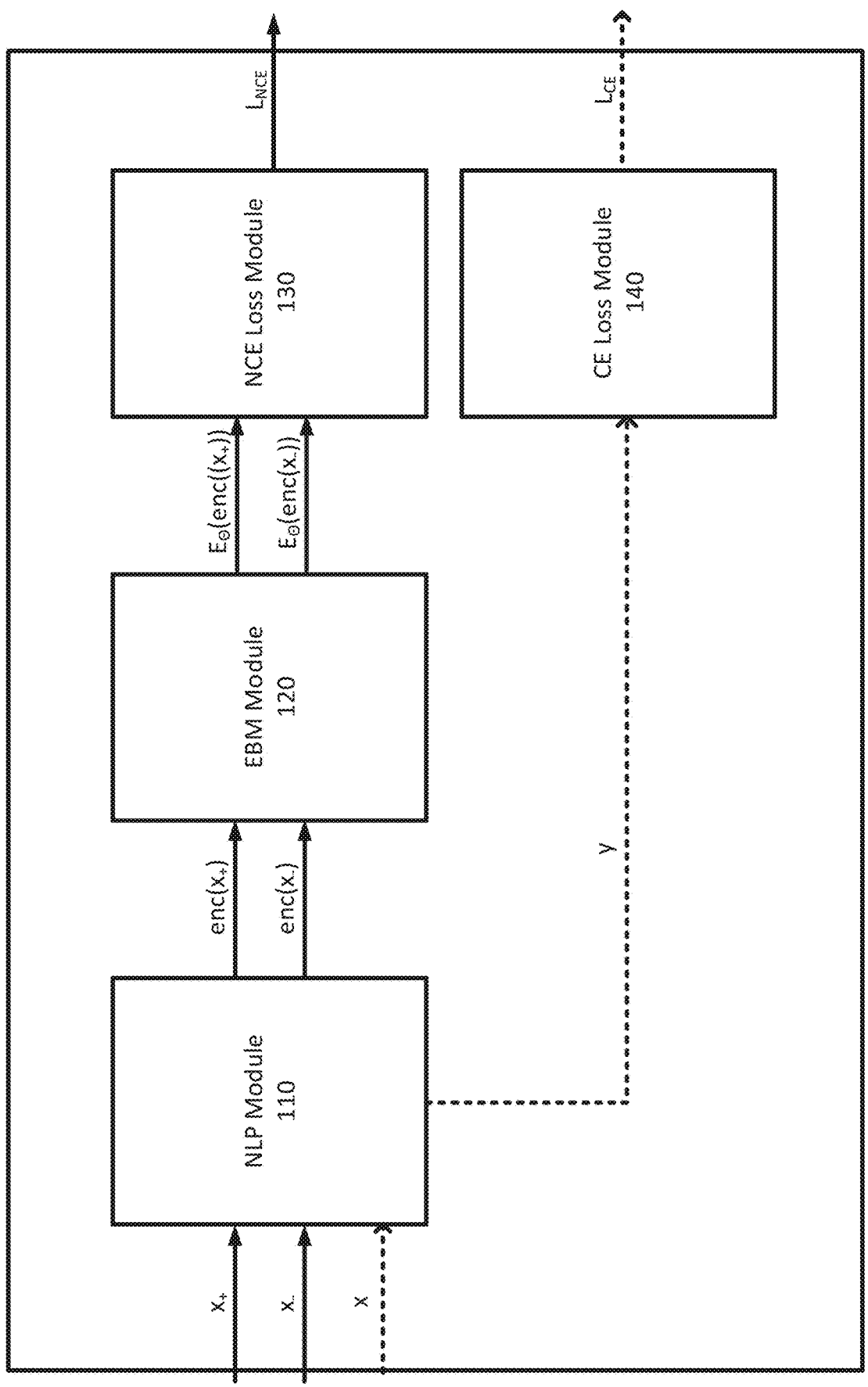
FIG. 1 is a simplified structural diagram of a system 100 for training a NLP classifier using one or more EBMs, according to some embodiments described herein.

FIG. 1 is a simplified structural diagram of a system 100 for training a NLP classifier using one or more EBMs, according to some embodiments. As shown in FIG. 1, the system may comprise a NLP module 110, an EBM module 120, and a NCE loss module 130.

Figure 2:
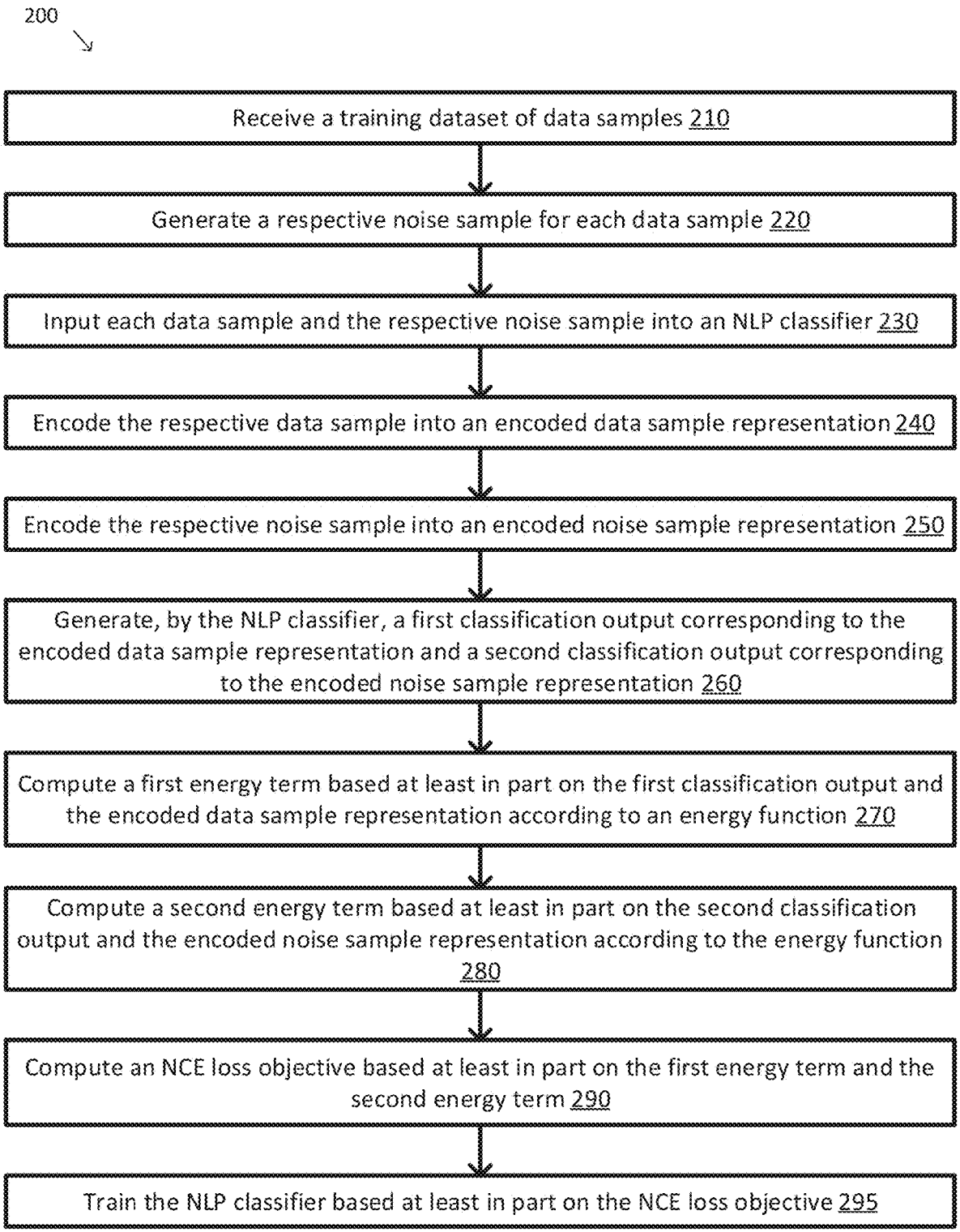
FIG. 2 is a simplified logic flow diagram illustrating a method for NLP using one or more EBMs, according to some embodiments described herein.

The NLP module 110 may be configured to perform one or more of operations 240, 250, and 260 described herein with respect to FIG. 2. For instance, as shown in FIG. 1, the NLP module may be configured to receive, via a data interface (not shown in FIG. 1), a plurality of data samples and respective noise samples. The data samples may be denoted as $x_+$ and the respective noise samples may be denoted as $x_-$. For each data sample and respective noise sample, the NLP module may be configured to encode the data sample into an encoded data sample representation and to encode the respective noise sample into an encoded noise sample representation. The encoded data sample representation may be denoted as $E_{x_+ \sim P_D}$ and the encoded noise sample representation may be denoted as $E_{x_- \sim P_N}$, where $P_D$ may denote a data probability distribution and $P_N$ may denote a noise probability distribution. The NLP module may be configured to generate a first classification output corresponding to the encoded data sample representation and a second classification output corresponding to the encoded noise sample representation. The first classification output may be denoted as $enc(x_+)$ and the second classification output may be denoted as $enc(x_-)$.

According to some embodiments, the NLP module may be further configured to perform one or more of operations 210, 220, and 230 described herein with respect to FIG. 2. For instance, the NLP module may be configured to receive, via a data interface (not shown in FIG. 1), a training data set of data samples that correspond to a data probability distribution. The NLP module may be configured to generate, for each data sample from the training dataset, a respective noise sample according to a noise probability distribution.

According to other embodiments, the NLP module may be configured to receive the plurality of data samples and respective noise samples from a pre-processing module (not show in FIG. 1), which may be configured to perform the one or more operations 210, 220, and 230 described herein with respect to FIG. 2. For instance, the preprocessing module may be configured to receive, via a data interface (not shown in FIG. 1), a training data set of data samples that correspond to a data probability distribution. The preprocessing module may be configured to generate, for each data sample from the training dataset, a respective noise sample according to a noise probability distribution. The preprocessing module may be configured to input each data sample and the respective noise sample to the NLP classifier.

The EBM module may be configured to perform one or more of operations 270 and 280 described herein with respect to FIG. 2. For instance, as shown in FIG. 1, the EBM module may be configured to compute a first energy term based at least in part on the first classification output and the encoded data sample representation. The EBM module 120 may be configured to compute the first energy term (e.g., $\hat{E}_\theta(x_+)$) in response to the input $x_+$, according to an energy function. The energy function may comprise one or more members selected from the group consisting of a scalar function, a hidden function, and a sharp-hidden function, as described herein. Similarly, the EBM module 120 may be configured to compute a second energy term (e.g., $\hat{E}_\theta(x_-)$) in response to the input $x_-$ based at least in part on the second classification output and the encoded noise sample representation according to the energy function.

Figure 4:
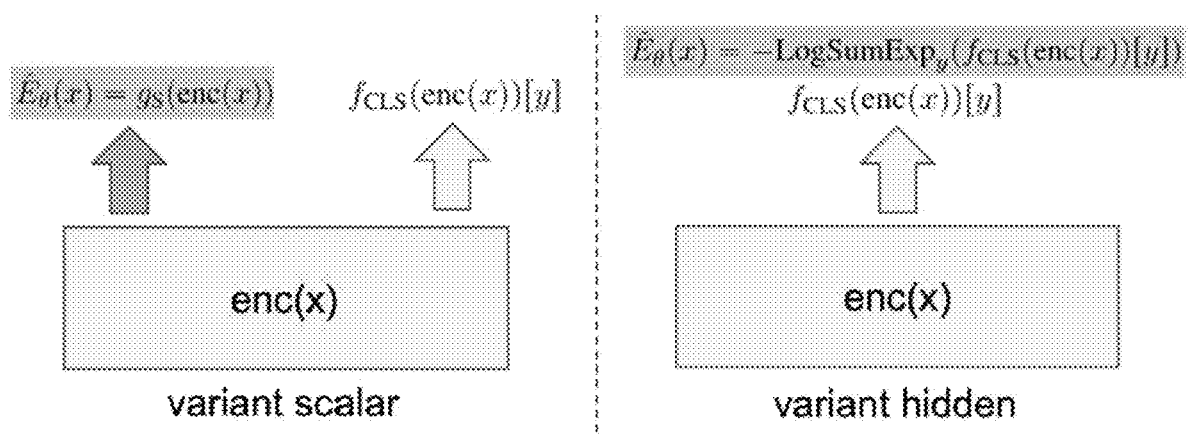
FIG. 4 shows a visualization of the scalar and hidden energy functions described herein.

In one implementation, the energy function employed by the EBM module 120 may comprise a scalar function, as shown in the left panel of FIG. 4. As shown in the left panel of FIG. 4, the scalar function may compute the first or second energy term directly from the encoded data sample representation, bypassing logits of the first classification output. The scalar function may compute one or both of the first energy term and the second energy term by first applying a linear layer transformation to the encoded data sample representation. The scalar function may compute one or both of the first energy term and the second energy term by then subtracting a logarithm of a noise distribution $P_N$ introduced for the NCE loss, as described herein. That is, the scalar function may be defined as $\hat{E}_\theta(x)=g_s(enc(x))$. The energy term may be computed as $E_\theta(x)=g_s(enc(x))-\log P_N(X)$.

In another implementation, the energy function employed by the EBM module 120 may comprise a hidden function, as shown in the right panel of FIG. 4. As shown in the right panel of FIG. 4, in comparison to the scalar function described herein, the hidden function may directly utilize logits of the first classification output in computing the first or second energy terms. The hidden function may compute one or both of the first energy term and the second energy term by first applying a multivariable softplus transformation to a plurality of logits of the first classification output. The hidden function may compute one or both of the first energy term and the second energy term by then subtracting a logarithm of a noise distribution $P_N$ introduced for the NCE loss, as described herein. That is, the hidden function may be defined as $\hat{E}_\theta(x)=-\text{LogSumExp}_y(f_{CLS}(enc(x))[y])$. The energy term may be computed as $E_\theta(x)=-\text{LogSumExp}_y(f_{CLS}(enc(x))[y])-\log P_N(X)$. Here, $f_{CLS}(enc(x))$ refers to the output logits, whose dimension may be equal to the number of possible classes |Y|. The y-th logit is denoted by $f_{CLS}(enc(x))[y]$.

In another implementation, the energy function employed by the EBM module 120 may comprise a sharp-hidden function. In comparison to the scalar function described herein, the sharp-hidden function may directly utilize logits of the first classification output in computing the first or second energy terms. The sharp-hidden function may compute one or both of the first energy term and the second energy term by first applying a negative maximum transformation to a plurality of logits of the first classification output. The sharp-hidden function may compute one or both of the first energy term and the second energy term by then subtracting a logarithm of a noise distribution $P_N$ introduced for the NCE loss, as described herein. That is, the sharp-hidden function may be defined as $$\hat{E}_\theta(x) = -\max_y f_{CLS}(enc(x))[y].$$

The energy term may be computed as $$E_\theta(x) = -\max_y f_{CLS}(enc(x))[y] - \log P_N(x).$$

Returning to the discussion of FIG. 1, the NCE module may be configured to perform operation 290 described herein with respect to FIG. 2. For instance, as shown in FIG. 1, the NCE module may be configured to compute a NCE loss objective based at least in part on the first energy term and the second energy term. The NCE loss objective may be denoted as $L_{NCE}$. The NCE loss objective may be computed by computing a first expectation of a first weighted softplus component based on the first energy term, computing a second expectation of a second weighted softplus component based on the second energy term, and computing a weighted sum of the first expectation and the second expectation. The first expectation may be taken over the data distribution. The second expectation may be taken over the noise distribution.

In one embodiment, the NCE loss objective may be configured to train the model to discriminate between data samples and noise samples from the noise distribution $P_N$. The NCE loss objective may be formulated in terms of a posterior distribution $P_\theta(x)$. The NCE loss objective may be formulated as $$L_{NCE} = \\ E_{x_+ \sim P_D} - \log \frac{P_\theta(x_+)}{P_\theta(x_+) + K*P_N(x_+)} + K*E_{x_- \sim P_N} - \log \frac{K*P_N(x_-)}{P_\theta(x_-) + K*P_N(x_-)}.$$

Here, K is the ratio of noise samples. The ratio may be at least about 1, 2, 4, 8, 16, or more. The ratio may be at most about 16, 8, 4, 2, 1, or less. The ratio may be within a range defined by any two of the preceding values. $P_\theta(x)$ may be defined as a negative exponential function of the energy function.

In another embodiment, to tackle the situation when terms involving $P_N(x)$ are small, the energy terms $E_\theta(x)$ described herein may be employed and $P_\theta(x)$ may be defined as $P_\theta(x)=\exp(-E_\theta(x))$. In this manner, the $P_N(x)$ terms cancel and the NCE loss objective may be formulated as $$L_{NCE} = \\ E_{x_+ \sim P_D} - \log \frac{1}{1 + K*\exp(\hat{E}_\theta(x_+))} + K*E_{x_- \sim P_N} - \log \frac{K}{K + \exp(-\hat{E}_\theta(x_-))}.$$

According to some embodiments, the NCE module 130 may be further configured to perform operation 295 described herein with respect to FIG. 2. For instance, the NCE module 130 may be configured to update the NLP classifier 110 based at least in part on the NCE loss objective. The NCE module may be configured to train the NLP classifier based solely on the NCE loss objective.

Alternatively, the NLP module 110 may be jointly trained by the NCE loss and a cross-entropy (CE) loss. A CE loss module 140 may be used to compute the cross entropy loss, based on the output predicted label in response to an input x to the NLP module 110, as shown in dashed line. For example, the training samples may be taken from a training dataset according to the data distribution $P_D$ and may be in the form of (x, y) pairs, where x usually refers to a single or a pair of sentences, and y refers to the corresponding label. The CE loss module may be configured to compute a CE loss objective as $L_{CE}=E_{(x, y)\sim P_D}(-\log P_\theta(y|x))$.

In such cases, the NCE module 130 and the CE module 140 may be configured to update the NLP classifier by joint optimization (for instance, using the Adam optimizer disclosed in D. Kingma and J. Ba, Adam: A method for stochastic optimization, 3rd International Conference for Learning Representations, San Diego (2015), which is herein incorporated by reference in its entirety for all purposes) according to a joint loss objective $L_{joint}=L_{NCE}+L_{CE}$. Updating the NLP classifier in this joint manner may make the NLP classifier aware of $P_\theta(x)$ and $P_\theta(y|x)$, instead of focusing solely on $P_\theta(y|x)$. Such awareness of $P_\theta(x)$ may improve calibration by allowing the NLP classifier to be more conservative when it detects that an input is out-of-distribution.

For example, at each iterative pass during training, the NCE loss may be computed in response to the contrastive inputs $x_+$ and $x_-$ as described above. At the same iterative pass, the CE loss may be computed using a separate input x sampled from the training dataset, or based on the output generated according to input $x_+$. The weighted sum of the NCE loss and the CE loss can be computed at each iterative pass to update the NLP module 110 via backpropagation.

According to other embodiments, the NCE module may be configured to output the NCE loss objective to a training module (not shown in FIG. 1). The training module may be configured to train the NLP classifier based at least in part on the NCE loss objective.

FIG. 2 is a simplified logic flow diagram illustrating a method 200 for NLP using one or more EBMs, according to some embodiments.

At operation 210, the method may comprise receiving a training dataset of data samples. The training dataset may correspond to a data probability distribution, as described herein. The training dataset may be received via a data interface, as described herein. The data samples may be similar to any data samples described herein.

At operation 220, the method may comprise generating a respective noise sample for each data sample. The respective noise sample may be generated according to a noise probability distribution, as described herein. The respective noise samples may be similar to any respective noise samples described herein.

At operation 230, the method may comprise inputting each data sample and the respective noise sample into an NLP classifier. The NLP classifier may be implemented as NLP module 110 described herein.

At operation 240, the method may comprise encoding the respective data sample into an encoded data sample representation. The encoded data sample representation may be similar to any encoded data sample representation described herein.

At operation 250, the method may comprise encoding the respective noise sample into an encoded noise sample representation. The encoded noise sample representation may be similar to any encoded noise sample representation described herein.

At operation 260, the method may comprise generating, by the NLP classifier, a first classification output corresponding to the encoded data sample representation and a second classification output corresponding to the encoded noise sample representation. The first classification output may be similar to any first classification output described herein. The second classification output may be similar to any second classification output described herein.

At operation 270, the method may comprise computing a first energy term based at least in part on the first classification and the encoded data sample representation according to an energy function. The first energy term may be similar to any first energy term described herein. The energy function may be similar to any energy function described herein.

At operation 280, the method may comprise computing a second energy term based at least in part on the second classification output and the encoded noise sample representation according to the energy function. The second energy term may be similar to any second energy term described herein.

At operation 290, the method may comprise computing an NCE loss objective based at least in part on the first energy term and the second energy term. The NCE loss objective may be similar to any NCE loss objective described herein.

At operation 295, the method may comprise training the NLP classifier based at least in part on the NCE loss objective. Training the NLP based at least in part on the NCE loss objective may comprise training the NLP solely on the NCE loss objective. Training the NLP based at least in part on the NCE loss objective may comprise training the NLP based on a combination of the NCE loss objective and a CE loss computed based on the first classification output conditioned on a respective data input sample. The CE loss may be similar to any CE loss described herein.

Figure 3:
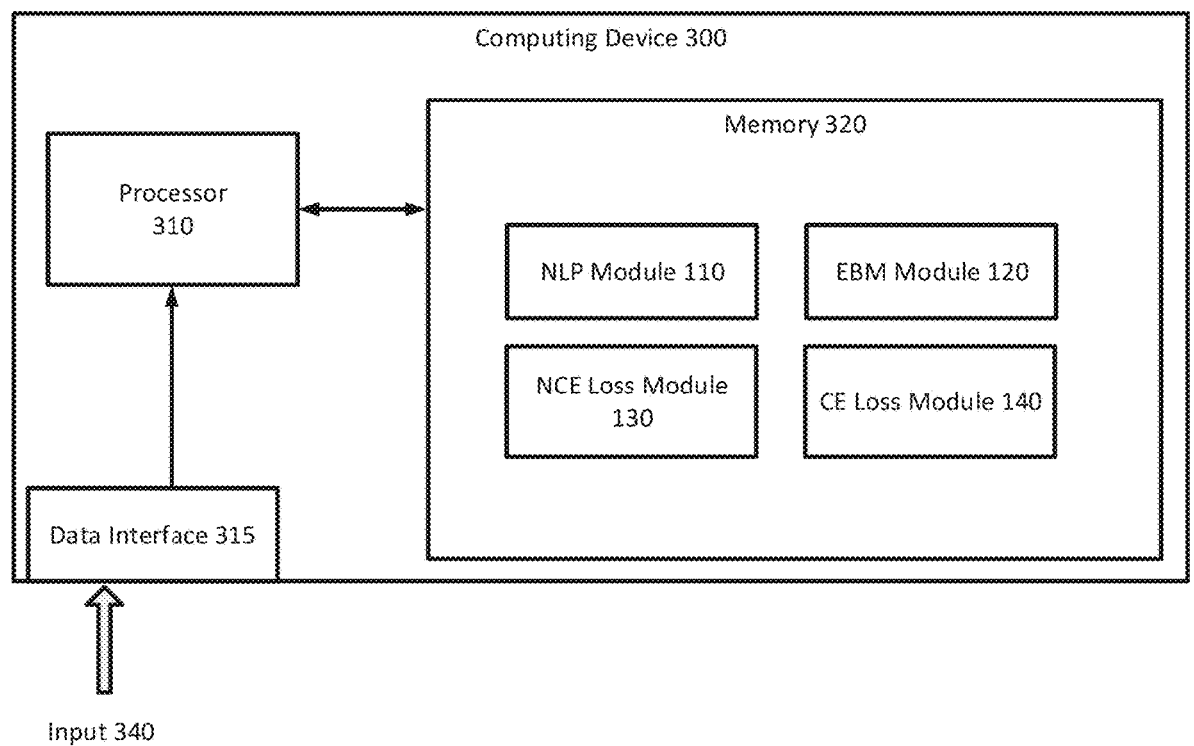
FIG. 3 is a simplified diagram of a computing device for training a NLP classifier using one or more EBMs, according to some embodiments described herein.

FIG. 3 is a simplified diagram of a computing device for training a NLP classifier using one or more EBMs, according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein (such as method 200 described herein with respect to FIG. 2). For example, as shown, memory 320 includes instructions for NLP module 110 that may be used to implement and/or emulate the systems and models, and/or to implement any of the methods described further herein. In some examples, the NLP module 110, may receive an input 340, e.g., such as a training dataset described herein, via a data interface 315. The data interface 315 may be any of a user interface that receives an input sentence from a user, or a communication interface that may receive or retrieve an input sentence from a database.

In some embodiments, the memory 320 includes an EBM module 120, a NCE module 130, and a CE module 140. The NLP module, EBM module, NCE module, and CE module are configured to perform operations of the method 200 described herein to the input to train an NLP classifier, as described herein.

FIG. 4 shows a visualization of the scalar and hidden energy functions described herein.

EXAMPLES

For the choice of noise distribution in our preliminary trials the GPT-2 language model (disclosed in A. Radford et al, Language models are unsupervised multitask learners (2019), available at https://d4mucfpksyws.cloudfront.net/better-language-models/language-models.pdf, which is herein incorporated by reference in its entirety for all purposes) was finetuned with samples from the target training set using the standard LM objective. An objective similar to the masked language model (MLM) loss (disclosed in J. Devlin et al, BERT: pre-training of deep bidirectional transformers for language understanding, CoRR abs/1810.04805 (2018), which is herein incorporated by reference in its entirety for all purposes) was adopted during the finetuning of the noise model. With a given mask ratio M, a part of x was randomly masked, and the model was trained to complete it:

$$L_{MLM} = E_{x \sim P_D, x^m \sim P_{mask}(x^m | x; M)} - \log P_N(x | x^m).$$

During noise sample generation, adopting the same mask ratio M, we a masked $x^m$ was fed to the MLM (x is from the training set), and the generated sample was used as the noise sample. In this way, the noise distribution was made closer to the data distribution. In our experiments we set M=4. During generation, top-k sampling was used (disclosed in A. Fan et al, Hierarchical neural story generation, in Proceedings of the 56th Annual Meeting of the Association for Computational Linguistics (Volume 1: Long Papers), pgs. 889-898 (2018), which is herein incorporated by reference in its entirety for all purposes) with k=20.

Examples of generated noise samples and masking are shown in Table 1. Note that the masks could be applied to a consecutive span of words (masking is applied to each token independently with probability M).

TABLE 1

Examples of generated noise samples on SST-2. The original words that are masked are also shown.

Input: absolutely and completely <M> (ridiculous)
Gen: absolutely and completely hilarious
Input: <M> (as a) young <M> (woman) of great charm,
<M> (generosity) and diplomacy
Gen: of a young man with a great charm, wit and diplomacy Another possible way to get noise samples is to sample from BERT or Roberta with masked input.

Finetuning of the Roberta-base model on eight GLUE tasks (disclosed in A. Wang et al, GLUE: A multi-task benchmark and analysis platform for natural language understanding, in Proceedings of the 2018 EMNLP Workshop BlackBoxNLP: Analyzing and Interpreting Neural Networks for NLP, pgs. 353-355 (2018), which is herein incorporated by reference in its entirety for all purposes) was considered. Results on STS-B were not included because it is a regression task. To measure calibration error, the expected calibration error (ECE) metric with B (number of bins) set to 20 was used. The ECE is defined as follows. Given an input sample x, for each label y, a model predicts that x belongs to label y with confidence $P_\theta(x|y)$. Assuming the test-set contains n samples, there will be n*|Y| predictions. ECE first partitions all predictions into B equally-spaced bins by its confidence. With B=20, the width of each bin is 0.05. For example, the first bin contains all predictions that have confidence in the range of [0, 0.5). Then for each bin ECE computes how the average of confidence is different from its actual accuracy:

$$ECE = \frac{1}{|Y|} \sum_{b=1}^{B} \frac{|B_{yb}|}{n} |acc(B_{yb}) - conf(B_{yb})|,$$

where n is the number of samples in the test set, and $acc(B_{yb})$ is simply the ratio of samples x whose true label is indeed y in $B_{yb}$.

For baseline or NCE training, the recommended hyperparameters (learning rate, batch size, etc.) for Roberta were followed. EBM training was compared with three strong baselines for calibration: posterior calibrated training (PosCal) (disclosed in T. Jung et al, Posterior calibrated training on sentence classification tasks, in Proceedings of the 58th Annual Meeting of the Association for Computational Linguistics, pgs. 2723-2730 (2020), which is herein incorporated by reference in its entirety for all purposes, temperature scaling (T-Scal) (disclosed in C. Guo et al, On calibration of modern neural networks, Proceedings of Machine Learning Research vol. 70, pgs. 1321-1330 (2017), which is herein incorporated by reference in its entirety for all purposes), and scaling-binning calibrator (Scal-bin) (disclosed in A. Kumar et al, Verified uncertainty calibration, In Advances in Neural Information Processing Systems 32, pgs. 3792-3803 (2019), which is herein incorporated by reference in its entirety for all purposes. For PosCal and Scal-bin, the published code was used. Scal-bin and T-Scal require a development set for parameter learning and a test set for evaluation, but for each GLUE task only one labeled development set was available. Therefore, half of the standard development set was treated as test set and the other half was treated as development set.

Table 2 shows comparisons of test-set accuracy and ECE for different methods on the GLUE tasks. For fair comparison between Scal-bin, T-Scal, and EBM training (which does not use the development set), the methods are applied to the whole training set. Performance when applied to the development set is available provided for reference.

TABLE 2

Test-set accuracy and ECE results for different methods on GLUE tasks.

| Method | SST-2 acc. | SST-2 ECE | MNLI acc. | MNLI ECE | MNLI(mm) acc. | MNLI(mm) ECE |
|---|---|---|---|---|---|---|
| Baseline | 0.942 | 0.050 | 0.876 | 0.067 | 0.872 | 0.068 |
| Scal-bin(train) | 0.940 | 0.036 | 0.872 | 0.051 | 0.869 | 0.056 |
| T-Scal(train) | 0.942 | 0.042 | 0.876 | 0.058 | 0.872 | 0.060 |
| PosCal | 0.944 | 0.040 | 0.876 | 0.067 | 0.872 | 0.067 |
| (EBM)scalar | 0.942 | 0.033 | 0.871 | 0.038 | 0.871 | 0.047 |
| (EBM)hidden | 0.956 | 0.032 | 0.869 | 0.032 | 0.868 | 0.044 |
| (EBM)s-hidden | 0.947 | 0.038 | 0.875 | 0.027 | 0.872 | 0.031 |
| Scal-bin(dev) | 0.944 | 0.019 | 0.876 | 0.030 | 0.870 | 0.032 |
| T-Scal(dev) | 0.942 | 0.037 | 0.876 | 0.024 | 0.872 | 0.026 |

| Method | QNLI acc. | QNLI ECE | QQP acc. | QQP ECE | MRPC acc. | MRPC ECE |
|---|---|---|---|---|---|---|
| Baseline | 0.929 | 0.043 | 0.904 | 0.034 | 0.862 | 0.133 |
| Scal-bin(train) | 0.931 | 0.034 | 0.904 | 0.035 | 0.843 | 0.092 |
| T-Scal(train) | 0.929 | 0.030 | 0.904 | 0.034 | 0.862 | 0.126 |
| PosCal | 0.930 | 0.039 | 0.905 | 0.032 | 0.867 | 0.129 |
| (EBM)scalar | 0.927 | 0.016 | 0.899 | 0.034 | 0.862 | 0.098 |
| (EBM)hidden | 0.923 | 0.016 | 0.900 | 0.033 | 0.867 | 0.099 |
| (EBM)s-hidden | 0.930 | 0.016 | 0.904 | 0.019 | 0.862 | 0.089 |
| Scal-bin(dev) | 0.931 | 0.021 | 0.905 | 0.021 | 0.862 | 0.062 |
| T-Scal(dev) | 0.929 | 0.018 | 0.904 | 0.026 | 0.862 | 0.126 |

| Method | COLA mcc. | COLA ECE | RTE acc. | RTE ECE | WNLI acc. | WNLI ECE |
|---|---|---|---|---|---|---|
| Baseline | 0.539 | 0.182 | 0.724 | 0.279 | 0.571 | 0.058 |
| Scal-bin(train) | 0.586 | 0.146 | 0.717 | 0.271 | 0.457 | 0.144 |
| T-Scal(train) | 0.539 | 0.175 | 0.724 | 0.275 | 0.571 | 0.063 |
| PosCal | 0.540 | 0.184 | 0.789 | 0.206 | 0.571 | 0.060 |
| (EBM)scalar | 0.540 | 0.150 | 0.753 | 0.207 | 0.542 | 0.033 |
| (EBM)hidden | 0.545 | 0.131 | 0.797 | 0.148 | 0.542 | 0.036 |
| (EBM)s-hidden | 0.563 | 0.133 | 0.811 | 0.182 | 0.571 | 0.073 |
| Scal-bin(dev) | 0.557 | 0.048 | 0.731 | 0.042 | 0.542 | 0.189 |
| T-Scal(dev) | 0.539 | 0.109 | 0.724 | 0.235 | 0.571 | 0.046 |

"s-hidden" refers to the sharp-hidden variant.
The leading zeros are omitted to save space.
Note that T-Scal and Scal-bin are applied to the training set or the development set, respectively.
For each task, the method that achieves best calibration without using the development set is shown in bold.

Figure 5:
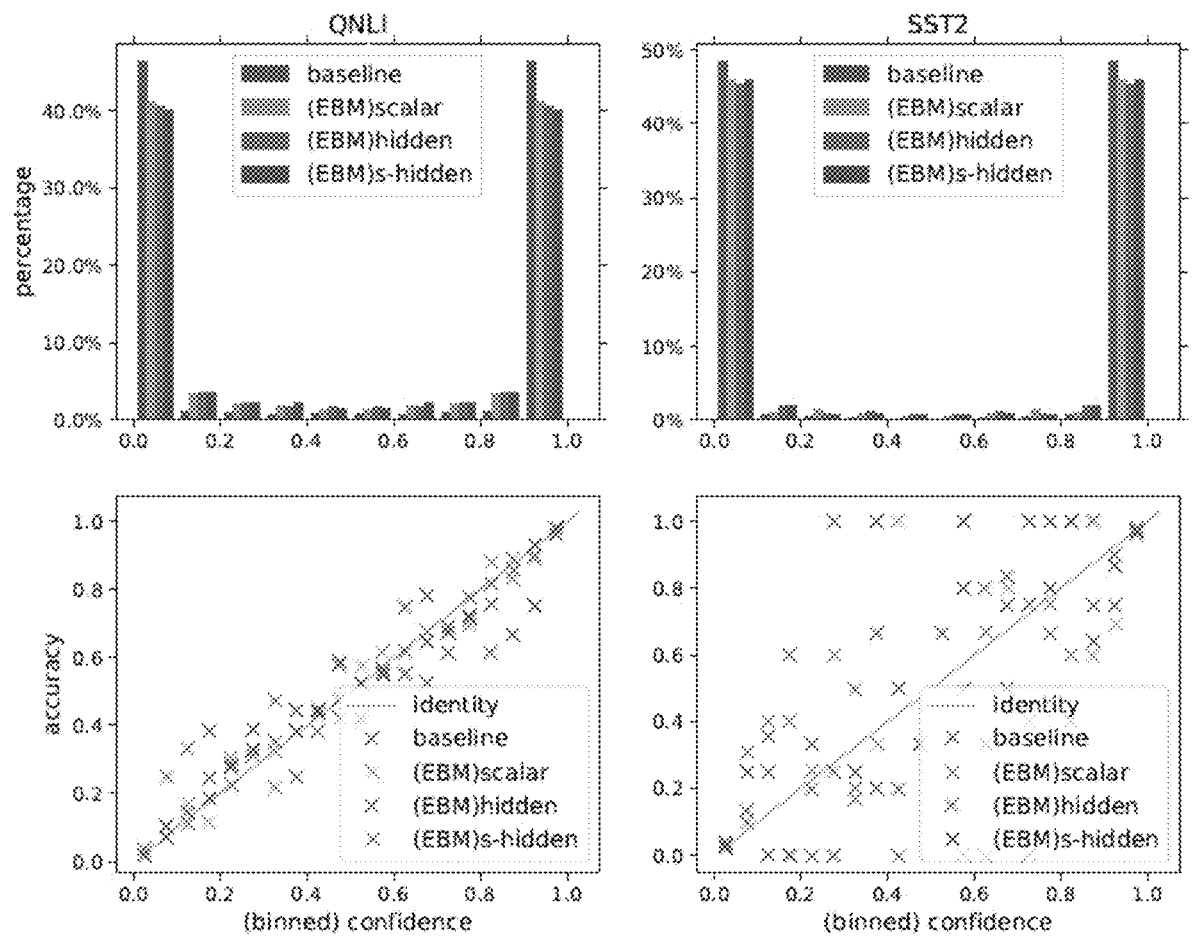
FIG. 5 shows calibration metrics for a variety of classifiers on the QNLI and SST-2 tasks.

In most tasks, all three EBM variants get significant improvement in ECE with little or no loss in accuracy comparing to the (strong) baseline methods. Moreover, the performance of EBM training is comparable to Scal-bin and T-Scal applied to the development set, while their performance degrades when the development set is not available. Among the three variants, on average, the sharp-hidden variant achieves the best accuracy, while the hidden variant achieves best calibration. The calibration error is shown in FIG. 5.

Figure 6:
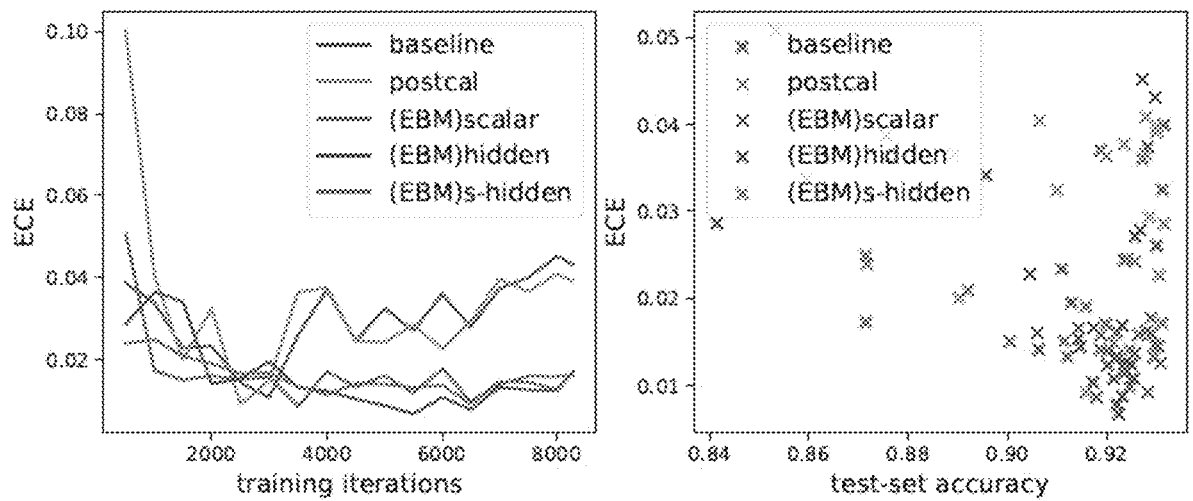
FIG. 6 shows how test-set estimated calibration error (ECE) changes during training for a variety of classifiers.

FIG. 6 shows how test-set ECE changes during training. It is shown as the training reaches the high-accuracy area, the calibration for baseline model becomes worse, while EBM training is able to reach a better trade-off between accuracy and calibration.

Figure 7:
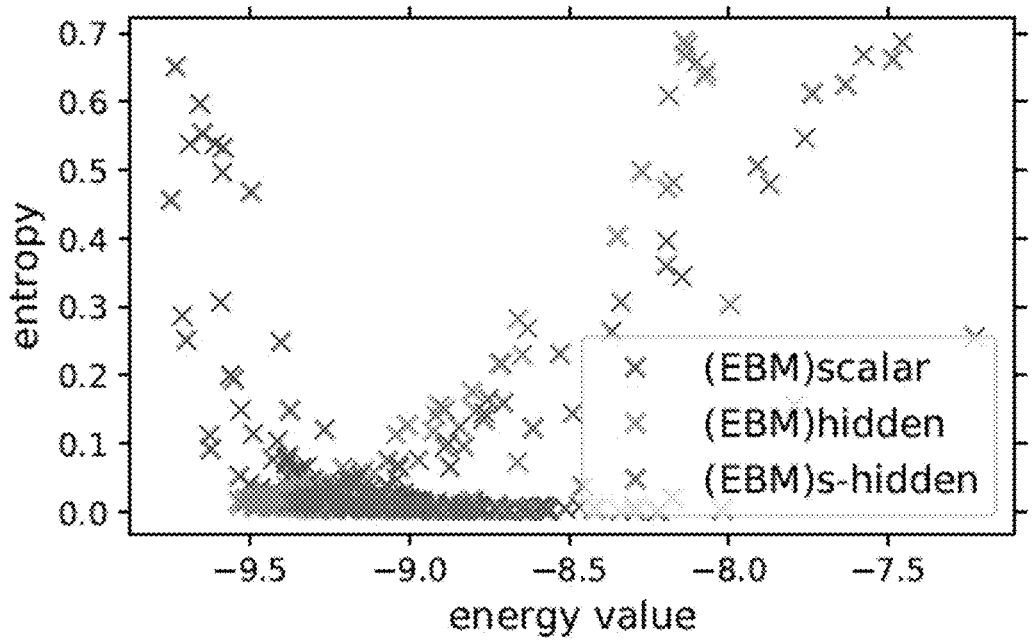
FIG. 7 shows energy values versus entropies of the posterior distribution for EBMs described herein, using samples in the SST-2 test set.

How does the model get better calibration? FIG. 7 shows the energy value $\hat{E}_\theta(x)$ versus the entropy of the posterior distribution $$\mathcal{H}(P_\theta(\cdot \mid x)) = \sum_{y=1}^{|\mathcal{Y}|} -P_\theta(y \mid x)\log P_\theta(y \mid x),$$

for samples in the SST-2 test set. It is shown that models trained with the hidden and sharp-hidden variants tend to assign more conservative predictions (reflected by higher entropy) for higher energy (less likely) samples. This may be due to the strong coupling between the energy function and the classification logits. Concrete examples are provided in Table 3.

TABLE 3

The change of the model's confidence (posterior distribution) for low and high-energy data samples of SST-2 and QNLI. The EBM variant shown is sharp-hidden.

Text: when the film ended, i felt tired and drained and wanted to lie on my own deathbed. Label: 1 $E_\theta(x)$: −9.37 Baseline: (.999, .001) EBM: (.998, .002)
Text: sit through this one, you won't need a magic watch to stop time; your dvd player will do it for you. Label: 1 $E_\theta(x)$: −7.57 Baseline: (.006, .994) EBM: (.345, .655)
Text: Q: What city north of New York was settled by Huguenots? A: Huguenot immigrants did not disperse or settle in different parts of the country, but rather, formed three societies or congregations; one in the city of New York, another 21 miles north of New York in a town which they named New Rochelle, and a third further upstate in New Paltz. Label: 1 $E_\theta(x)$: −8.48 Baseline: (.997, .003) EBM: (.995, .005)
Text: Q: What is the source of oxygen production through electrocatalytic means? A: A similar method is the electrocatalytic O2 evolution from oxides and oxoacids. Label: 1 $E_\theta(x)$: 4.22 Baseline: (.252, .748) EBM: (.472, .527)

Some examples of computing devices, such as computing device 300 may include non-transitory, tangible, machine readable media that include executable code that when run by one or more processors (e.g., processor 310) may cause the one or more processors to perform the processes of method 200. Some common forms of machine readable media that may include the processes of method 200 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for training a natural language processing (NLP) classifier, comprising:
    receiving, via a data interface, a training dataset of data samples that correspond to a data probability distribution;
    generating, for at least one data sample from the training dataset, a respective noise sample according to a noise probability distribution;
    inputting a data sample and the respective noise sample to the NLP classifier;
    encoding the respective data sample into an encoded data sample representation;
    encoding the respective noise sample into an encoded noise sample representation;
    generating, by the NLP classifier, a first classification output corresponding to the encoded data sample representation and a second classification output corresponding to the encoded noise sample representation;
    computing a first energy term based at least in part on the first classification output and the encoded data sample representation according to an energy function selected from the group consisting of a scalar function, a hidden function, and a sharp-hidden function;
    computing a second energy term based at least in part on the second classification output and the encoded noise sample representation according to the energy function;
    computing a noise contrastive estimation (NCE) loss objective based at least in part on the first energy term and the second energy term; and
    training the NLP classifier based at least in part on a combination of the NCE loss objective and a cross-entropy loss computed based on the first classification output conditioned on a respective data input sample.

2. The method of claim 1, wherein the first energy term is computed according to the scalar function by a linear layer transformation of the encoded data sample representation.

3. The method of claim 1, wherein the first energy term is computed according to the hidden function by applying a multivariable softplus transformation to a plurality of logits of the first classification output.

4. The method of claim 1, wherein the first energy term is computed according to the sharp-hidden function by applying a negative maximum transformation to at least a plurality of logits of the first classification output.

5. The method of claim 1, wherein the NCE loss objective is computed by:
    computing a first expectation of a first weighted softplus component based on the first energy term, wherein the first expectation is taken over the data distribution;
    computing a second expectation of a second weighted softplus component based on the second energy term, wherein the second expectation is taken over the noise distribution; and
    computing a weighted sum of the first expectation and the second expectation.

6. A system for training a natural language processing (NLP) classifier, comprising:
    a non-transitory memory; and
    one or more processor coupled to the non-transitory memory and configured to read instructions from the non-transitory memory to cause the system to perform operations comprising:
        receiving, via a data interface, a training dataset of data samples that correspond to a data probability distribution;
        generating, for at least one data sample from the training dataset, a respective noise sample according to a noise probability distribution;
        inputting a data sample and the respective noise sample to the NLP classifier;
        encoding the respective data sample into an encoded data sample representation;
        encoding the respective noise sample into an encoded noise sample representation;
        generating, by the NLP classifier, a first classification output corresponding to the encoded data sample representation and a second classification output corresponding to the encoded noise sample representation;
        computing a first energy term based at least in part on the first classification output and the encoded data sample representation according to an energy function selected from the group consisting of a scalar function, a hidden function, and a sharp-hidden function;
        computing a second energy term based at least in part on the second classification output and the encoded noise sample representation according to the energy function;
        computing a noise contrastive estimation (NCE) loss objective based at least in part on the first energy term and the second energy term; and
        training the NLP classifier based at least in part on a combination of the NCE loss objective and a cross-entropy loss computed based on the first classification output conditioned on a respective data input sample.

7. The system of claim 6, wherein the first energy term is computed according to the scalar function by a linear layer transformation of the encoded data sample representation.

8. The system of claim 6, wherein the first energy term is computed according to the hidden function by applying a multivariable softplus transformation to a plurality of logits of the first classification output.

9. The system of claim 6, wherein the first energy term is computed according to the sharp-hidden function by applying a negative maximum transformation to at least a plurality of logits of the first classification output.

10. The system of claim 6, wherein the NCE loss objective is computed by:
    computing a first expectation of a first weighted softplus component based on the first energy term, wherein the first expectation is taken over the data distribution;

computing a second expectation of a second weighted softplus component based on the second energy term, wherein the second expectation is taken over the noise distribution; and computing a weighted sum of the first expectation and the second expectation.

11. A non-transitory, machine-readable medium having stored thereon machine-readable instructions executable to cause a system to perform operations comprising:

receiving, via a data interface, a training dataset of data samples that correspond to a data probability distribution;

generating, for at least one data sample from the training dataset, a respective noise sample according to a noise probability distribution;

inputting a data sample and the respective noise sample to a natural language processing (NLP) classifier;

encoding the respective data sample into an encoded data sample representation;

encoding the respective noise sample into an encoded noise sample representation;

generating, by the NLP classifier, a first classification output corresponding to the encoded data sample representation and a second classification output corresponding to the encoded noise sample representation;

computing a first energy term based at least in part on the first classification output and the encoded data sample representation according to an energy function selected from the group consisting of a scalar function, a hidden function, and a sharp-hidden function;

computing a second energy term based at least in part on the second classification output and the encoded noise sample representation according to the energy function;

computing a noise contrastive estimation (NCE) loss objective based at least in part on the first energy term and the second energy term; and training the NLP classifier based at least in part on a combination of the NCE loss objective and a cross-entropy loss computed based on the first classification output conditioned on a respective data input sample.

12. The non-transitory, machine-readable medium of claim 11, wherein the first energy term is computed according to the scalar function by a linear layer transformation of the encoded data sample representation.

13. The non-transitory, machine-readable medium of claim 11, wherein the first energy term is computed according to the hidden function by applying a multivariable softplus transformation to a plurality of logits of the first classification output.

14. The non-transitory, machine-readable medium of claim 11, wherein the first energy term is computed according to the sharp-hidden function by applying a negative maximum transformation to at least a plurality of logits of the first classification output.

15. The non-transitory, machine-readable medium of claim 11, wherein the NCE loss objective is computed by:

computing a first expectation of a first weighted softplus component based on the first energy term, wherein the first expectation is taken over the data distribution;

computing a second expectation of a second weighted softplus component based on the second energy term, wherein the second expectation is taken over the noise distribution; and computing a weighted sum of the first expectation and the second expectation.

* * * * *